US005462127A

United States Patent [19]

Svensson

[11] Patent Number: 5,462,127

[45] Date of Patent: Oct. 31, 1995

[54] HOLDING DEVICE

[76] Inventor: Anders Svensson, Myrstigen 2, S 561 39 Huskvarna, Sweden

[21] Appl. No.: 170,293

[22] PCT Filed: Jul. 6, 1992

[86] PCT No.: PCT/SE92/00507

§ 371 Date: Dec. 30, 1993

§ 102(e) Date: Dec. 30, 1993

[87] PCT Pub. No.: WO93/01028

PCT Pub. Date: Jan. 21, 1993

[30] Foreign Application Priority Data

Jul. 12, 1991 [SE] Sweden .................................. 9102173

[51] Int. Cl.[6] ............................ B25D 17/24; B23D 79/02

[52] U.S. Cl. ................... 173/162.2; 173/211; 173/162.1; 29/81.11; 29/81.16

[58] Field of Search ................................ 173/211, 162.1, 173/162.2, 186, 170; 29/81.05, 81.11, 81.15, 81.16

[56] References Cited

U.S. PATENT DOCUMENTS

| | | | |
|---|---|---|---|
| 1,898,369 | 2/1933 | Hohmann et al. | 173/186 |
| 2,776,653 | 1/1957 | Eaton | 173/162.1 |
| 2,904,320 | 9/1959 | Salisbury et al. | 173/170 |
| 3,369,614 | 2/1968 | Anthony | 173/162.1 |
| 4,402,369 | 9/1983 | Nikitin et al. | 173/162.1 |
| 5,095,600 | 3/1992 | Allan | 173/162.2 |

FOREIGN PATENT DOCUMENTS

| | | |
|---|---|---|
| 35918 | 10/1911 | Sweden . |
| 379165 | 9/1975 | Sweden . |
| 2092938 | 8/1982 | United Kingdom . |

*Primary Examiner*—Scott A. Smith
*Attorney, Agent, or Firm*—Cushman, Darby & Cushman

[57] ABSTRACT

The present invention is for a holder for a device comprising axially vibrating and/or beating tools, e.g. a device for removal of hard layers by axing using an axially vibrating and beating chisel. The device is manually controlled and transfer of vibrations and beats from the chisel to the handles is eliminated or much reduced by shock absorbers which are arranged parallel to the chisel. The chisel and its power machine are mounted onto the holder by a shaft which is connected to the lower ends of the shock absorbers. The device also comprises a backward support so that in operation it does not need to be held in position but only directed.

5 Claims, 1 Drawing Sheet

HOLDING DEVICE

BACKGROUND OF THE INVENTION

The present invention is for a holder for a device having axially vibrating and/or beating tools, e.g. a device for removal of hard layers by axing using a mainly axially vibrating and/or beating chisel.

By axing one uses a chisel to cut away layers and material from a bedding. Axing is used in the building business during repair and maintenace work. By repair and maintenance of floors old floor material or floor beds must be removed. This bed can be e.g. concrete, so-called fluid putty or the like. For this purpose chisels are used, the working edges of which have a width of about 100 mm and the length of the chisel together with its vibration generating power machine is about 1 m. This unit is intended to be held by hand during working. As the material which shall be removed often is hard and strong and difficult to separate from its bedding, forceful vibrations together with beating of the chisel is required. This is obtained by using a power machine which is driven by a suitable motor which in the case of building work or other work which are fully or partly done indoor, suitably is an electric motor. The vibrating and beating of the machine brings with it considerable physical strains for the person doing the work and may bring with it temporary as well as chronic injuries. It also means that the time during which continuous work can be performed is very limited.

In order to reduce the incoveniences when using these kind of machines, various measures have been tried primarily concerning the design and material of the handles. It has been tried to make the handles which are directly fastened on to the power machine, resilient or elastic e.g. by making them from rubber having suitable properties. Even though certain improvements have hereby been achieved the results are far from satisfactory. In order to obtain the best result of the work and as rapid axing of the material to be removed as possible, it is important that beating and vibrations have the correct power and frequency. Also these factors are influenced by how the tool is handled by the operator, e.g. by the force with which the tool is forced against the floor.

SUMMARY OF THE INVENTION

One objection of the present invention is to avoid beating and vibrations being transferred from the machine to the operator. Another object of the invention is to obtain an ergonomically correct position of working which means that the operator can do his job standing with a straight back. Another object of the invention is to obtain a better function of the tool by achieving constant conditions of work. A device according to the invention compries one or more shock absorbers which are essentially parallel with the axial direction of the chisel, whereby the transfer of the movements of the tool to the handles are in principle eliminated and injuries caused by vibrations are avoided.

BRIEF DESCRIPTION OF THE INVENTION

The invention shall below be described more closely in connection with the embodiment shown in the figures.

DETAILED DESCRIPTION OF THE PREFERRED EMBODIMENT

Figure 1:
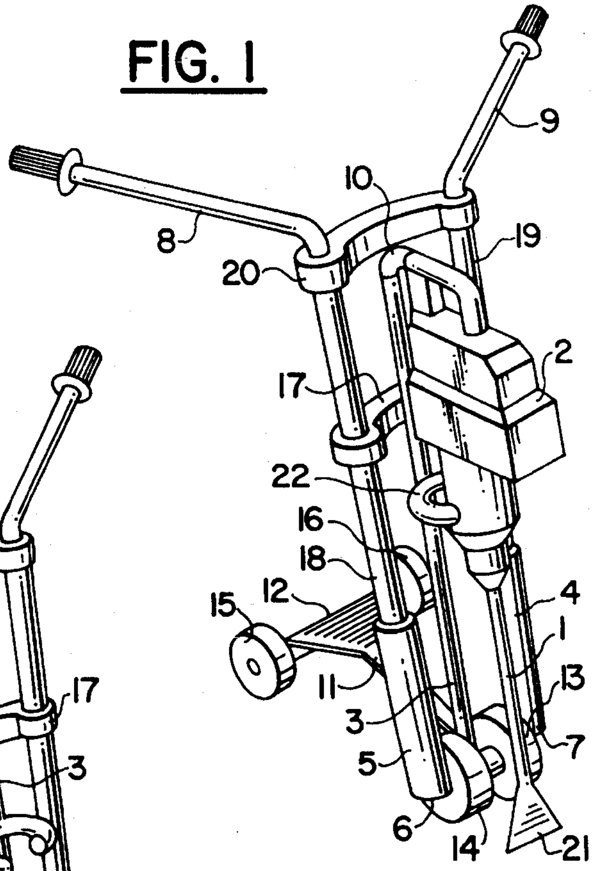
FIG. 1 shows a device according to the invention with axing chisel, power machine and holding device with handle.
Figure 2:
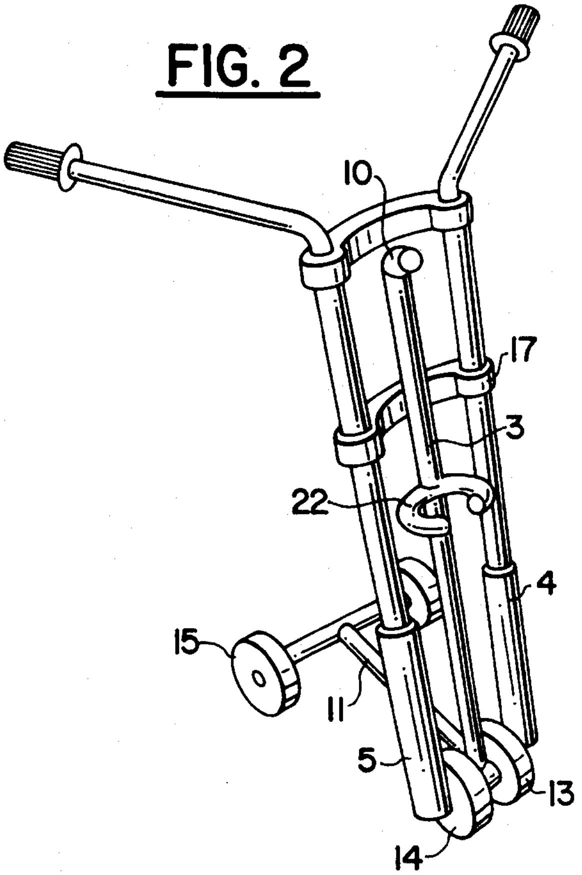
FIG. 2 shows the holding device with handle and support details.
Figure 3:
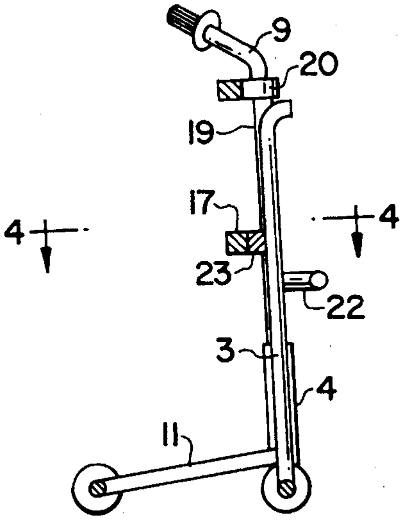
FIG. 3 shows a section through the device of FIG. 1.
Figure 4:
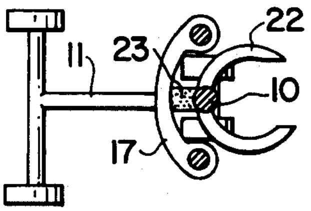
FIG. 4 shows a section of the holding device along the line 4—4 of FIG. 3.

The device shown in FIG. 1 comprises an axing chisel 1 which at its lower end has a perpendicular edge 21. The chisel is attached to a power machine 2 of conventional kind which is powered by an electric motor. The device is attached to the fastening means or structure 3 by a fastening member 22 and an upper fastening member 10 which may also include vibration damping elements of conventional kind, e.g. rubber bushings. The holding means 3 is at its lower end movably connected to the lower ends 6,7 of two parallel shock absorbers 4, 5 via fastening means, so that the fastening means can turn around a shaft 24 between the shock absorbers. The upper parts 18, 19 of the shock absorber are held together by means of two struts 17, 20. At the,top of the shock absorbers two handles 8, 9 are mounted. In order to hold the shock absorbers 4, 5 in a position which is essentially parallel with the fastening means 3, there is as shown in FIGS. 3 and 4 a connection between the power machine 2 and the strut 17 which consists of a spring or a soft rubber bushing 23, preferably a coil spring which does not transfer the movements of the power machine to the handle. The device also has a backwardly directed strut 11 which ends with short perpendicular shaft onto which two wheels 15, 16 are mounted. The backwardly directed strut 11 is in operation stiffly connected to the fastening means 3. The shape of the strut may vary as may also its mounting onto the fastening means and the strut may for transportation and storing purposes be movably connected to the fastening means and foldable there against. Between the wheels there may also be a support plate 12. The shaft between the lower ends of the shock absorbers which also carries the fastening means 3 is also a wheel shaft and carries two wheels 13 and 14. The fastening of the tool to the fastening means is so designed that the angle of the tool towards the fastening means is adjustable and therewith also the angle of the tool towards the floor which is important for the efficiency of axing Jobs.

When the device is to be used it is adjusted so that the edge 21 of the chisel and the two back wheels 15 and 16 rest the floor. Hereby the axis of the chisel and the fastening means parallel therewith and the shock absorbers shall be slightly backwards inclined as shown in FIG. 3. The chisel and the shock absorbers are essentially parallel to each other but may also be positioned so that there is a small angle between them as shown in FIG. 3. In order to obtain this the fastening of the power machine is adjustable relative to the shock absorbers and the handles since the fastening means 3 comprises a lower part and thereupon a movable upper part which carries the fastening members 10 and 22. The upper part may be displaced axially on the lower part and locked in a position as wanted. It can be so adjusted so that when the specified depth of axing has been obtained the front wheels 13, 14 are in contact with the floor.

I claim:

1. A holder for a device having an axially vibrating tool comprising:

fastening structure constructed and arranged to receive the tool so as to be mounted with respect thereto;

at least one shock absorber having upper and lower ends and disposed generally parallel with respect to a longitudinally axis of the tool when the tool is mounted with respect to said fastening structure;

wheel structure connected to lower ends of said at least one shock absorber so as to support the holder in wheel supporting relation during operation of the tool; and handle structure extending from said upper end of said at least one shock absorber, wherein a pair of spaced shock absorbers are provided, said handle structure including a pair of handles, each shock absorber being associated with a respective handle at an upper end thereof, said lower ends of said shock absorbers being coupled together by a shaft, said fastening structure being pivotally coupled to said shaft at a distal end thereof.

2. The holder according to claim 1, further comprising a strut having first and second ends, said first end being coupled to said distal end of said fastening structure and extending in a direction generally transverse to a longitudinal extent of said shock absorbers, said strut including at least one wheel mounted to said second end thereof, said wheel cooperating with said wheel structure to support the holder in a position whereby said shock absorbers are inclined in a direction toward said at least one wheel.

3. The holder according to claim 1, further comprising a support strut coupling said shock absorbers, said fastening structure being coupled to said strut via a resilient member so as to minimize transfer of vibration from the fastening structure to said handles during operation of the holder.

4. The holder according to claim 1, wherein said fastening structure includes a rod disposed between said pair of shock absorbers, a first end of said rod being coupled to said shaft, a second end of said rod including a fastening member constructed and arranged to be coupled to a portion of the tool, a central portion of said rod including a generally C-shaped member constructed and arranged to be coupled to another portion of the tool to hold the tool with respect to the holder.

5. The holder according to claim 1, wherein said fastening structure is constructed and arranged to be adjustable relative to said shock absorbers so that during operation, the wheel structure maintains support of the holder.

* * * * *